United States Patent [19]

Just et al.

[11] Patent Number: 4,704,442
[45] Date of Patent: Nov. 3, 1987

[54] CURABLE COPOLYMERS, A PROCESS FOR THEIR PREPARATION AND THEIR USE

[75] Inventors: Christoph Just, Niedernhausen/Taunus; Dieter Plath; Gerd Walz, both of Wiesbaden, all of Fed. Rep. of Germany

[73] Assignee: Hoechst AG, Fed. Rep. of Germany

[21] Appl. No.: 826,789

[22] Filed: Feb. 6, 1986

[30] Foreign Application Priority Data

Feb. 8, 1985 [DE] Fed. Rep. of Germany ....... 3504337

[51] Int. Cl.⁴ .............................................. C08F 24/00
[52] U.S. Cl. .................................. 526/273; 526/301; 526/304
[58] Field of Search ...................... 526/304, 301, 273

[56] References Cited

U.S. PATENT DOCUMENTS 4,507,188 3/1985 Chu .................................. 526/301

Primary Examiner—Paul R. Michl
Assistant Examiner—Alex H. Walker
Attorney, Agent, or Firm—Bierman & Muserlian

[57] ABSTRACT

Copolymers based on (A) 5–95% by weight of at least one polymerizable carbamoyloxyalkyldicarboxylic acid ester, carrying hydroxyl groups, of the general formula I

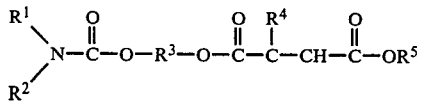

in which $R^1$ represents hydrogen or alkyl or hydroxyalkyl having in each case 1 to 30 carbon atoms in the alkyl radical, $R^2$ represents alkyl or hydroxyalkyl having in each case 1 to 30 carbon atoms in the alkyl radical, or the radical

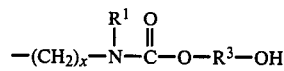

subject to the proviso that $R^1$ is hydrogen and x is an integer from 2 to 10, $R^3$ represents linear or branched alkylene having 2 to 5 carbon atoms, $R^4$ represents hydrogen or methyl and $R^5$ represents hydroxyalkyl or hydroxyaminoalkyl having in each case 2 to 20 carbon atoms in the alkyl radical, or an alkyl radical of this type which also contains ester groups and/or ether groups, and (B) 5–95% by weight of at least one copolymerizable monomer belonging to the group comprising (a) α,β-olefinically unsaturated monocarboxylic acid and alkyl and hydroxyalkyl esters thereof having in each case 1 to 18 carbon atoms in the alkyl radical, and amides and nitriles thereof, and also monoalkyl and dialkyl esters of α,β-olefinically unsaturated dicarboxylic acids having 1 to 18 carbon atoms in the alkyl radical, (b) vinyl-aromatic monomers, (c) vinyl esters of organic monocarboxylic acids having 1 to 18 carbon atoms in the carboxylic acid radical, and (d) glycidyl esters of unsaturated monocarboxylic and/or dicarboxylic acids, the sum of the components (A) and (B) being in all cases 100% by weight, and a process for their preparation.

The copolymers are used for the preparation of shaped articles and/or coatings which have excellent properties.

18 Claims, No Drawings

CURABLE COPOLYMERS, A PROCESS FOR THEIR PREPARATION AND THEIR USE

It is known to cure polyacrylic compounds containing hydroxyl groups by means of polyisocyanates or masked polyisocyanates.

Copolymers of carbamoyloxycarboxylates carrying no hydroxyl groups are also known (U.S. Pat. No. 3,479,328). In order to cure copolymers of this type, the latter are modified with aldehydes to give compounds carrying alkylol groups. These alkylol groups can additionally also be etherified. The aldehyde-modified polymers are more reactive, but less stable than the etherified polymers. Polymers modified in this manner can be crosslinked by using crosslinking agents which are suitable for polymers containing alkylol groups. These agents include, for example, methylolphenol-formaldehyde and melamineformaldehyde resins, and also acids, such as p-toluenesulfonic acid.

It is also known (German Pat. No. 2,422,170) to prepare copolymers from carbamoyloxyalkylcarboxylic acid esters and copolymerizable monomers. The curing of these copolymers by using polyisocyanates and/or amine resins cannot, however, be inferred from the state of the art.

The invention was therefore based on the object of preparing copolymers which, by virtue of the simultaneous presence of hydroxyl and urethane groups, exhibit a high functionality and hence a high reactivity and which are therefore distinguished by particularly advantageous properties.

The invention relates to curable copolymers based on
(A) 5-95% by weight of at least one polymerizable carbamoyloxyalkyldicarboxylic acid ester, carrying hydroxyl groups, of the general formula (I)

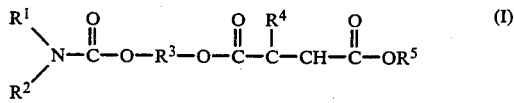

in which
R$^1$ represents hydrogen or alkyl or hydroxyalkyl having in each case 1 to 30 carbon atoms in the alkyl radical,
R$^2$ represents alkyl or hydroxyalkyl having in each case 1 to 30 carbon atoms in the alkyl radical, or the radical

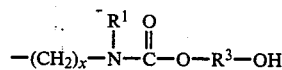

subject to the proviso that R$^1$ is hydrogen and x is an integer from 2 to 10,
R$^3$ represents linear or branched alkylene having 2 to 5 carbon atoms;
R$^4$ represents hydrogen or methyl and
R$^5$ represents hydroxyalkyl or hydroxyaminoalkyl having in each case 2 to 20 carbon atoms in the alkyl radical, or an alkyl radical of this type which also contains ester and/or ether groups, and
(B) 5-95% by weight of at least one copolymerizable monomer belonging to the group comprising
  (a) an α,β-olefinically unsaturated monocarboxylic acid and alkyl and hydroxyalkyl esters thereof having in each case 1 to 18, preferably 1 to 8, carbon atoms in the alkyl radical, and amides and nitriles thereof, and also monoalkyl and dialkyl esters of α, β-olefinically unsaturated dicarboxylic acids having 1 to 18 carbon atoms in the alkyl radical,
  (b) vinyl-aromatic monomers,
  (c) vinyl esters of organic monocarboxylic acids having 1 to 18 carbon atoms in the carboxylic acid radical, and
  (d) glycidyl esters of unsaturated monocarboxylic and/or dicarboxylic acids,
the sum of the components (A) and (B) being in all cases 100% by weight.

The component (B) contains at least one monomer, the ratios being, in general, 0-95% by weight of the monomers (a), 5-100% by weight of the monomers (b), 0-95% by weight of the monomers (c) and 0-50% by weight of the monomers (d), and the sum of all the monomers being in all cases 100% by weight.

The invention also relates to a process for the preparation of the copolymers and to their use.

In the general formula (I),
R$^1$ preferably denotes hydrogen or alkyl or hydroxyalkyl having in each case 2 to 20 carbon atoms in the alkyl radical,
R$^2$ preferably denotes alkyl or hydroxyalkyl having in each case 2 to 20 carbon atoms in the alkyl radical, or the radical

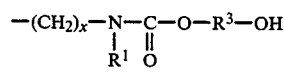

subject to the proviso that R$^1$ is hydrogen and x is an integer from 2 to 6,
R$^3$ preferably denotes alkylene having 2 to 3 carbon atoms,
R$^4$ preferably denotes hydrogen or methyl and
R$^5$ preferably denotes a hydroxyalkyl ester radical of a branched, saturated fatty acid having 9 to 11 carbon atoms in the acid radical, or hydroxyalkyl, each having 2 to 14 carbon atoms in the alkyl group.

The compounds used as the starting material, carbamoyloxyalkyldicarboxylic acid esters of the general formula (I) are described in copending U.S. patent application Ser. No. 826,790, filed on the same day, "Polymerizable, carbamoyloxyalkyldicarboxylic acid esters carrying hydroxyl groups, a process for their preparation and their use". The starting materials are prepared by the processes mentioned in the parallel application, to which reference is hereby made, including the preferred embodiments. One or more monomers from the following groups can be employed for the copolymerization of the compound of the formula (I):

(a) α,β-olefinically unsaturated monocarboxylic acids, alkyl and hydroxyalkyl esters thereof having in each case 1 to 18, preferably 1 to 8 carbon atoms in the alkyl radical, and amides and nitriles thereof, and monoalkyl and dialkyl esters of α,β-olefinically unsaturated dicarboxylic acids having 1 to 18, preferably 1 to 8 carbon atoms in the alkyl radical, such as acrylic acid and methacrylic acid, methyl and ethyl esters thereof, the various isopropyl esters, the various butyl esters, 2-ethylhexyl ester or stearyl ester, preferably acrylic acid, acrylonitrile, acrylamide, methyl acrylate, butyl acrylate, 2-ethylhexyl acrylate and methyl methacrylate, and also 2-hydroxy (meth)acrylate, 2-hydroxypropyl (meth)acrylate, 4-hydroxybutyl (meth)acrylate and also reaction products of (meth)acrylic acid with a glycidyl ester of α-alkylalkanemonocarboxylic acids of the empirical formula $C_{12-14}H_{22-26}O_3$, individually or as a mixture. The glycidyl radical in the glycidyl ester of the α-alkylalkanemonocarboxylic acids and/or α,α-dialkylalkanemonocarboxylic acids has the empirical formula $C_3H_5O$. The mixtures of α-alkylalkanoic acids and mixtures of α,α-dialkylalkanoic acids are monocarboxylic acids containing a $C_9$, $C_{10}$ and $C_{11}$ chain (described as glycidyl esters in the following text), (b) vinyl-aromatic monomers, such as styrene, o-methylstyrene, p-methylstyrene, α-methylstyrene and styrene derivatives alkylated in the nucleus, such as α-methyl-p-isopropylstyrene and α-methyl-m-isopropylstyrene, but preferably styrene, (c) vinyl esters of organic monocarboxylic acids having 1 to 18, preferably 2 to 11, carbon atoms in the acid component, such as vinyl acetate and vinyl propionate, preferably vinyl acetate, and the vinyl ester of Versatic acid and (d) glycidyl esters of α,β-olefinically unsaturated monocarboxylic and/or dicarboxylic acids, such as glycidyl (meth)acrylate.

The proportion of compounds of the formula (I) in the copolymer (component A) is 5 to 95, preferably 10 to 70, % by weight, whereas the proportion of copolymerizable monomers (B) amounts to 5 to 95, preferably 30 to 90, % by weight. The sum of the components (A) and (B) is in all cases 100%.

At least one of the monomers (a) to (d) can be used as component (B). However, preferred amounts are 0 to 95% by weight of the monomers (a), 5 to 100% by weight of the monomers (b), 0 to 95% by weight of the monomers (c) and 0 to 50% by weight of the monomers (d), the sum of the monomers being in all cases 100% by weight.

The process for the preparation of the copolymers is, in general, well known. The polymerization is preferably effected by the radical chain mechanism in the presence of substances which provide free radicals. Substances suitable for this are inorganic per-compounds, such as potassium persulfate or ammonium persulfate, alkali metal percarbonates, organic peroxide compounds, such as acyl peroxides, for example benzoyl peroxide, dibenzoyl peroxide, di-tert.-butyl peroxide, dilauryl peroxide, dicumyl peroxide and tert.-butyl perbenzoate, alkyl hydroperoxides, such as tert.-butyl hydroperoxide, cumene hydroperoxide, tert.-butyl hydroperoxide and tert.-butyl peroctoate, or azo compounds, such as α,α-azobisisobutyronitrile, and also peroxodicarbonates, such as dicyclohexyl and dicetyl peroxodicarbonate. The amount of catalyst is within the limits usually suitable, ie., for instance, between 0.01 and 5, preferably 0.01 and 2, % by weight, calculated on the total amount of monomers. In many cases it can also be desirable to add to the mixture of polymers molecular weight regulators, such as chain transfer agents or chain stoppers. Mercaptans, such as dodecyl mercaptan are normally used for this purpose, but it is also possible to add other agents which modify the chain length, such as cyclopentadiene, allyl carbamate, dimerized α-methylstyrene and similar agents which result in the formation of polymers of low molecular weight. In general, 0.01 to 2, preferably 0.01 to 1, % by weight of these compounds, relative to the total amount of monomers, is added.

The polymerization can be carried out in one stage or in several stages at temperatures from 20° to 270° C., preferably 60° to 180° C., if necessary under pressure, and in accordance with the customary methods of mass polymerization, solution polymerization, precipitation polymerization, dispersion polymerization, emulsion polymerization or bead polymerization. Mass, solution and emulsion polymerization, especially solution polymerization, are preferred. If polymerization is carried out in solution, the customarily used solvents, such as halogenated hydrocarbons, for example methylene chloride, trichloroethylene or tetrachloroethane, ketones, such as acetone or methylethyl ketone, esters, such as butyl acetate, ethylglycol acetate or methylglycol acetate, ethylene glycol bismethyl ether, diethylene glycol bismethyl ether, or aromatic hydrocarbons, such as toluene and xylene, are employed, in each case individually or as a mixture. A preferred solvent is xylene, preferably mixed with an aromatic solvent having a boiling range from 154° to 178° C. (Solvesso 100, Shell AG) and butyl acetate.

The copolymers formed generally have OH numbers of 30 to 200, preferably 45 to 180 and particularly 50 to 140. The acid numbers of the copolymers are, in general, <15, preferably <9. The viscosity of the copolymers at 20° C. is generally 200 to 3,000, preferably 400 to 2,500, mPa.s. The values were determined from the resulting solutions of the copolymers, after dilution with xylene to a solids content of 50% by weight (described in the following text as "20° C., 50% strength in xylene").

The copolymers according to the invention can be cured by means of the customary compounds which can be used for polymers containing OH groups. Compounds containing terminal isocyanate groups are particularly suitable. Examples of compounds of this type are polyisocyanates, such as the aliphatic trimethylene, tetramethylene, pentamethylene, hexamethylene, 1,2-propylene, 1,2-butylene, 2,3-butylene, 1,3-butylene, ethylidene and butylidene diisocyanate, dicycloalkylene diisocyanates, such as 1,3-cyclopentane, 1,4-cyclopentane and 1,2-cyclohexane diisocyanates, and also isophorone and hexamethylene diisocyanate, the aromatic diisocyanates, such as m-phenylene, p-phenylene, 4,4'-biphenyl, 1,5-naphthalene and 1,4-naphthalene diisocyanates, the aliphatic-aromatic diisocyantes, such as 4,4'-diphenylenemethane, 2,4-toluylene or 2,6-toluylene (or mixtures thereof), 4,4'-toluidine and 1,4-xylylene diisocyanates, the nuclear-substituted aromatic compounds, such as dianisidine diisocyanate, 4,4'-diphenyl-ether diisocyanate and chlorodiphenylene diisocyanate, the triisocyanates, such as triphenylmethane 4,4'-triisocyanate or 4"-triisocyanate, 1,3,5-benzene triisocyanate and 2,4,6-toluene triisocyanate, and the tetraisocyanates, such as 4,4'-diphenyldimethyldimethane 2,2'-5,5'-tetraisocyanate.

Instead of the polyisocyanates, it is also possible to use compounds which split off polyisocyanates, and also reaction products, containing isocyanate groups, of polyhydric alcohols with polyisocyanates, for example the reaction product of 1 mol of trimethylolpropane with 3 mol of toluylene diisocyanate, and also the polymerized polyisocyanates, such as the dimer of tolylene diisocyanate and the like, or trimerized or polymerized isocyanates such as are described, for instance, in German Pat. No. 951,168. Additionally, a reaction product formed from 1 mol of water and 3 mol of hexamethylene diisocyanate having an NCO content of 16–17% by weight is also suitable. The last-mentioned reaction product formed from water and hexamethylene diisocyanate is particularly preferred. The NCO content of the reaction product applies to a 75% strength by weight solution in xylene/ethyleneglycol acetate.

Amine resins are also suitable for curing the polymers according to the invention. Amine-aldehyde resins, i.e. aldehyde condensation products of melamine, urea, aceto-guanamine or similar compounds may be mentioned as an example. Preferred aldehyde condensation products of melamine include hexamethoxymethylmelamine, hexakis(methoxymethyl)melamine, ethoxymethoxymethylmelamine, hexamethylated methylolmelamine and the like and also benzyl urea and benzoguanamine.

The amount of crosslinking agent employed depends on the OH number of the copolymers according to the invention. In general, equimolar amounts are employed.

Curing is generally carried out at a temperature between 0° and 260° C., preferably 20° to 150° C. The temperature is dependent on the curing time. However, it is preferable to carry out the reaction at low temperatures.

By virtue of their various functional groups, the copolymers prepared in accordance with the invention have excellent properties. They exhibit, surprisingly, a very good resistance to chemicals at a relatively low hydroxyl number, for example resistance against gasoline, whereas the known polyacrylic resins in general only reach an adequate resistance to chemicals at OH numbers of at least 120. Furthermore, the copolymers according to the invention possess a high flexibility, toughness and elasticity and a good adhesion, so that they can, if desired, also be employed in mixtures of adhesives.

The copolymers according to the invention can be used in industry in a versatile manner, for example for the preparation of shaped articles and/or coatings. As a result of the presence of urethane groups, they produce a very good adhesion on substrates. For this reason they are suitable, for example, for linings and coatings, for example for vessels used in the chemical industry and for articles exposed to weathering. They are employed as paints and coatings above all for vehicle components, particularly for motor vehicles, industrial paints, household equipment, furniture and in the building industry or the like. It is also possible to add pigments and other customary additives to the coating materials. Thus they are used, for example, as binders for pigmented and clear priming paints and/or finishing paints; they can also be employed in integrated plastics/metal coatings.

In the examples which follow, P denotes parts by weight and % denotes percent by weight.

EXAMPLES

Starting materials

The preparation of the carbamoyloxyalkyldicarboxylic acid esters, carrying hydroxyl groups, which are used as the starting material and which are shown in Table 1 can be carried out in accordance with directions such as are described in copending U.S. patent application Ser. No. 826,790, already mentioned.

TABLE 1

| Compound | |
|---|---|
| A | $HO-CH_2-CH_2$<br>$\phantom{HO-CH_2-CH_2}\diagdown$<br>$\phantom{HO-CH_2-CH_2.}N-\overset{O}{\overset{\|}{C}}-O-CH_2-CH_2-O-\overset{O}{\overset{\|}{C}}-CH=CH-\overset{O}{\overset{\|}{C}}-O-GE$<br>$\phantom{HO-CH_2-CH_2}\diagup$<br>$HO-CH_2-CH_2$ |
| B | $CH_3-CH_2 \phantom{xxxxxxxx} O \phantom{xxxxxxxxxxxxxxxxx} O \phantom{xxxxxxxx} O \phantom{xxxxx} OH$<br>$CH_3(CH_2)_3-\overset{\|}{CH}-CH_2-NH-\overset{\|}{C}-O-CH_2-CH_2-O-\overset{\|}{C}-CH=CH-\overset{\|}{C}-O-CH_2-\overset{\|}{CH}-CH_3$ |
| C | $CH_3-CH_2 \phantom{xxxxxxxx} O \phantom{xxxxxxxxxxxxxxxxx} O \phantom{xxxxxxxx} O$<br>$CH_3(CH_2)_3-\overset{\|}{CH}-CH_2-NH-\overset{\|}{C}-O-CH_2-CH_2-O-\overset{\|}{C}-CH=CH-\overset{\|}{C}-O-GE$ |
| D | $CH_3-CH_2-CH_2-CH_2-NH-\overset{O}{\overset{\|}{C}}-O-CH_2-CH_2-O-\overset{O}{\overset{\|}{C}}-CH=CH-\overset{O}{\overset{\|}{C}}-O-GE$ |
| E | $HO-CH_2-CH_2-O-\overset{O}{\overset{\|}{C}}-NH-(CH_2)_6-NH-\overset{O}{\overset{\|}{C}}-O-CH_2-CH_2-O-\overset{O}{\overset{\|}{C}}-CH=CH-\overset{O}{\overset{\|}{C}}-O-GE$ |
| F | $HO-CH_2-CH_2-O-\overset{O}{\overset{\|}{C}}-NH-(CH_2)_6-NH-\overset{O}{\overset{\|}{C}}-O-CH_2-CH_2-O-\overset{O}{\overset{\|}{C}}-CH=CH-\overset{O}{\overset{\|}{C}}-O-CH_2-\overset{OH}{\overset{\|}{CH}}-CH_3$ |

GE = glycidyl ester

1–7

The compounds listed in Table 1 were polymerized, under nitrogen and with stirring, with the monomers listed in Table 2 in a solvent mixture composed of xylene, an aromatic mixture of hydrocarbons having a boiling point of 154° to 178° C. and butyl acetate (2:1:1). This was effected, on the one hand, by initially taking the compounds of Table 1 together with the solvent mixture and heating to 140° C., after which the added monomer mixture 1 was metered in in the course of three hours at a rate determined by the exothermic reaction. The first stage of the copolymerization can also be carried out by initially taking part of the solvent mixture, and the monomer mixture 1 is composed of the rest of the solvent, monomer and compounds of Table 1 and further additives (Example 3). In this case too, the monomer mixture 1 is added dropwise to the solvent mixture which has been heated to 140° C.

After the total amount of the monomer mixture 1 had been added, the monomer mixture 2 was added in the course of four hours at 140° C. and, when the addition was complete, the mixture was allowed to stand at 140° C. for one hour.

Details of the resulting copolymers in respect of OH number, acid number, solids content and viscosity at 20° C. (50% strength solution in xylene) are given in Table 2.

8 and 9

The procedure of Examples 1 to 7 was carried out using compounds E and F from Table 1, with the difference that the copolymerization temperature was 150° C. and the solvent employed was ethylglycol acetate. Details relating to the monomers used, the proportions of ingredients and the physical data of the resulting copolymers are given in Table 2.

alkyl radical, or an alkyl radical of this type which also contains esters or ether groups or both, and (B) 5–95% by weight of at least one copolymerizable monomer selected from the group consisting of
  (a) an $\alpha,\beta$-olefinically unsaturated monocarboxylic acid and alkyl and hydroxyalkyl esters thereof having in each case 1 to 18 carbon atoms in the alkyl radical, and amides and nitriles thereof, and also monoalkyl and dialkyl esters of $\alpha,\beta$-olefinically unsaturated dicarboxylic acids having 1 to 18 carbon atoms in the alkyl radical,
  (b) vinyl-aromatic monomers,
  (c) vinyl esters of organic monocarboxylic acids having 1 to 18 carbon atoms in the carboxylic acid radical, and

TABLE 2

|  |  | 1 | 2 | 3 | 4 | 5 | 6 | 7 | 8 | 9 |
|---|---|---|---|---|---|---|---|---|---|---|
| Solvent | P | 1200 | 200 | 333 | 1200 | 500 | 500 | 1000 | 233 | 113 |
| Compound from Tab. 1 |  | A | B | C | C | B | B | C | E | F |
| amount | P | 644 | 217 | 305 | 644 | 197 | 281 | 473 | 185 | 49 |
| Monomer mixture 1 |  |  |  |  |  |  |  |  |  |  |
| Solvent | P | — | 100 | 167 | — | — | — | 200 | 100 | 66 |
| Styrene | P | 57.2 | 22.2 | 27 | 57.2 | 31.6 | 151 | 76 | 17.5 | 5 |
| DTDBP | P | 9.2 | 2.25 | 3.75 | 9.2 | 3.75 | 3.75 | 9 | 2.5 | 1.5 |
| DDM | P | 6.0 | 1.35 | 2.25 | 6.0 | 2.25 | 2.25 | 5.4 | 1.5 | 0.9 |
| Monomer mixture 2 |  |  |  |  |  |  |  |  |  |  |
| Styrene |  | 696 | 200 | 269 | 696 | 348 | 46 | 835 | 65 | 138 |
| MMA | P | 272 | 28.4 | 116 | 272 | 137 | 196 | 330 | 60 | 90 |
| HEMA | P | 80 | 34.5 | 34 | 8.0 | 36 | 76 | 86 | 39 | 38 |
| DTDBP | P | 9.2 | 2.25 | 3.75 | 9.2 | 3.75 | 3.75 | 9 | 2.5 | 1.5 |
| DDM | P | 6.0 | 1.35 | 2.25 | 6.0 | 2.25 | 2.25 | 5.4 | 1.5 | 0.9 |
| OH number |  | 123 | 100 | 60 | 60 | 60 | 100 | 51 | 140 | 71 |
| Acid number |  | 5.3 | 2.0 | 5.0 | 9 | 4.8 | 4.6 | 3.1 | 8.1 | 3.0 |
| Solids content (1 hr/125° C.) |  | 60 | 60 | 59.6 | 59.3 | 59.8 | 58.2 | 59.9 | 53 | 60 |
| Viscosity (20°, 50% solution in xylene, mPa.s) |  | 490 | 2300 | 454 | 1053 | 842 | 1310 | 575 | — | 965 (in EGA) |

DTDBP = di-tert.-dibutyl peroxide
DDM = dodecyl mercaptan
MMA = methyl methacrylate
HEMA = hydroxyethyl methacrylate
EGA = ethylglycol acetate

We claim:

1. A curable copolymer based on (A) 5–95% by weight of at least one polymerizable carbamoyloxyalkyldicarboxylic acid ester, carrying hydroxyl groups, of the formula I

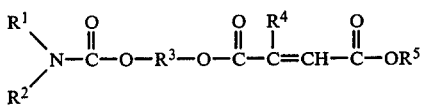

in which
  $R^1$ represents hydrogen or alkyl or hydroxyalkyl having in each case 1 to 30 carbon atoms in the alkyl radical,
  $R^2$ represents alkyl or hydroxyalkyl having in each case 1 to 30 carbon atoms in the alkyl radical, or the radical

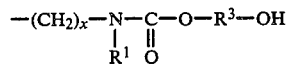

$R^1$ is hydrogen and x is an integer from 2 to 10,
  $R^3$ represents linear or branched alkylene having 2 to 5 carbon atoms,
  $R^4$ represents hydrogen or methyl and
  $R^5$ represents hydroxyalkyl or hydroxyaminoalkyl having in each case 2 to 20 carbon atoms in the (d) glycidyl esters of unsaturated monocarboxylic and dicarboxylic acids,
the sum of the components (A) and (B) being in all cases 100% by weight, in the presence of
(C) polymerization catalysts and, optionally
(D) molecular weight regulators.

2. Copolymer as claimed in claim 1, wherein in the proportion of the component (A) is 10 to 70% by weight and that of the component (B) is 30 to 90% by weight.

3. Copolymer as claimed in claim 1, wherein the monomers of component (B) are composed of 0 to 95% by weight of the monomers (a), 5 to 100% by weight of the monomers (b), 0 to 95% by weight of the monomers (c) and 0 to 50% by weight of the monomers (d), the sum of the monomers being in all cases 100% by weight.

4. Copolymer as claimed in claim 1, wherein the component (A) is a compound of the formula I in which
  $R^1$ denotes hydrogen or alkyl or hydroxyalkyl having in each case 2 to 20 carbon atoms in the alkyl radical,
  $R^2$ denotes alkyl or hydroxyalkyl having in each case 2 to 20 carbon atoms in the alkyl radical, or the radical

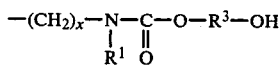

subject to the proviso that $R^1$ is hydrogen and x is an integer from 2 to 6, $R^3$ denotes alkylene having 2 to 3 carbon atoms, $R^4$ denotes hydrogen or methyl and $R^5$ denotes a hydroxyalkyl ester radical of a branched, saturated fatty acid having 9 to 11 carbon atoms in the acid radical, or hydroxyalkyl, each hydroxyalkyl having 2 to 14 carbon atoms in the alkyl group.

5. Copolymer as claimed in claim 1, wherein the component (B) is composed of at least one copolymerizable monomer, (a) an α,β-olefinically unsaturated monocarboxylic acid and alkyl and hydroxyalkyl esters thereof having in each case 1 to 8 carbon atoms in the alkyl radical or monoalkyl or dialkyl esters of α,β-olefinically unsaturated dicarboxylic acids having 1 to 8 carbon atoms in the alkyl radical, (b) at least one vinyl-aromatic monomer and (c) at least one vinyl ester of organic monocarboxylic acids having 2 to 11 carbon atoms in the acid component.

6. Copolymer as claimed in claim 5, wherein the component (B) is composed of at least one copolymerizable compound selected from the group consisting of acrylic acid, 2-ethylhexylacrylate, methylmethacrylate, hydroxyethylmethacrylate, styrene, vinyl acetate and the vinyl ester of Versatic acid.

7. Copolymer as claimed in claim 1, wherein the copolymers have OH numbers from 30 to 200 and the viscosity, as a 50% strength solution, is 200 to 3,000, mPa.s.

8. Process for the preparation of curable copolymers, which comprises copolymerizing (A) 5–95% by weight of at least one polymerizable carbamoyloxyalkyldicarboxylic acid ester, carrying hydroxyl groups, of the formula (I)

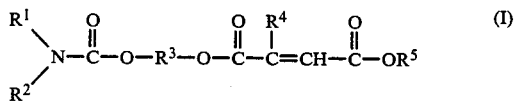

in which $R^1$ represents hydrogen or alkyl or hydroxyalkyl having in each case 1 to 30 carbon atoms in the alkyl radical, $R^2$ represents alkyl or hydroxyalkyl having in each case 1 to 30 carbon atoms in the alkyl radical, or the radical

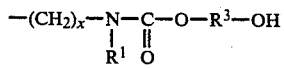

subject to the proviso that $R^1$ is hydrogen and x is an integer from 2 to 10, $R^3$ represents linear or branched alkylene having 2 to 5 carbon atoms, $R^4$ represents hydrogen or methyl and $R^5$ represents hydroxyalkyl or hydroxyaminoalkyl having in each case 2 to 20 carbon atoms in the alkyl radical, or an alkyl radical of this type which also contains ester groups or ether groups or both, and (B) 5–95% by weight of at least one copolymerizable monomer selected from the group consisting of
 (a) an α,β-olefinically unsaturated monocarboxylic acid and alkyl and hydroxy alkyl esters thereof having in each case 1 to 18, preferably 1 to 8, carbon atoms in the alkyl radical, and amides and nitriles thereof, and also monoalkyl and dialkyl esters of α,β-olefinically unsaturated dicarboxylic acids having 1 to 18 carbon atoms in the alkyl radical,
 (b) vinyl-aromatic monomers,
 (c) vinyl esters of organic monocarboxylic acids having 1 to 18 carbon atoms in the carboxylic acid radical, and
 (d) glycidyl esters of unsaturated monocarboxylic or dicarboxylic acids or both, the sum of the components (A) and (B) being in all cases 100% by weight, in the presence of (C) polymerization catalysts alone or together with (D) molecular weight regulators.

9. Process as claimed in claim 8, wherein the polymerization temperature is 20° to 270° C.

10. Process as claimed in claim 8, wherein the polymerization catalysts are employed in amounts of 0.01 to 5% by weight and molecular weight regulators (D) are employed in amounts of 0.01 to 2% by weight.

11. Process as claimed in claim 8, wherein the proportion of the component (A) is 10 to 70% by weight and that of the component (B) is 30 to 90% by weight.

12. Process as claimed in claim 8, wherein the monomers of component (B) are composed of 0 to 95% by weight of the monomers (a), 5 to 100% by weight of the monomers (b), 0 to 95% by weight of the monomers (c) and 0 to 50% by weight of the monomers (d), the sum of the monomers being in all cases 100% by weight.

13. Process as claimed in claim 8, wherein the component (A) is a compound of the formula I in which $R^1$ denotes hydrogen or alkyl or hydroxyalkyl having in each case 2 to 20 carbon atoms in the alkyl radical, $R^2$ denotes alkyl or hydroxyalkyl having in each case 2 to 20 carbon atoms in the alkyl radical, or the radical

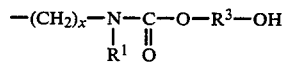

subject to the proviso that $R^1$ is hydrogen and x is an integer from 2 to 6, $R^3$ denotes alkylene having 2 to 3 carbon atoms, $R^4$ denotes hydrogen or methyl and $R^5$ denotes a hydroxyalkyl ester radical of a branched, saturated fatty acid having 9 to 11 carbon atoms in the acid radical, or hydroxyalkyl, each having 2 to 14 carbon atoms in the alkyl group.

14. Process as claimed in claim 8, wherein the component (B) is composed of at least one copolymerizable monomer (a) an α,β-olefinically unsaturated monocarboxylic acid and alkyl and hydroxyalkyl esters thereof having in each case 1 to 8 carbon atoms in the alkyl radical or monoalkyl or dialkyl esters of α,β-olefinically unsaturated dicarboxylic acids having 1 to 8 carbon atoms in the alkyl radical, (b) at least one vinyl-aromatic monomer and (c) at least one vinyl ester of organic monocarboxylic acids having 2 to 11 carbon atoms in the acid component.

15. Process as claimed in claim 14, wherein the component (B) is composed of at least one copolymerizable compound selected from the group consisting of acrylic acid, 2-ethylhexylacrylate, methylmethacrylate, hydroxyethylmethacrylate, styrene, vinyl acetate and the vinyl ester of Versatic acid.

16. Process as claimed in claim 8, wherein the copolymers have OH numbers from 30 to 200, and the viscosity, as a 50% strength solution, is 200 to 3,000 mPa.s.

17. Shaped articles and coatings, prepared from copolymers as claimed in claim 1.

18. Coatings as claimed in claim 17 as vehicle lacquers.

* * * * *